UNITED STATES PATENT OFFICE.

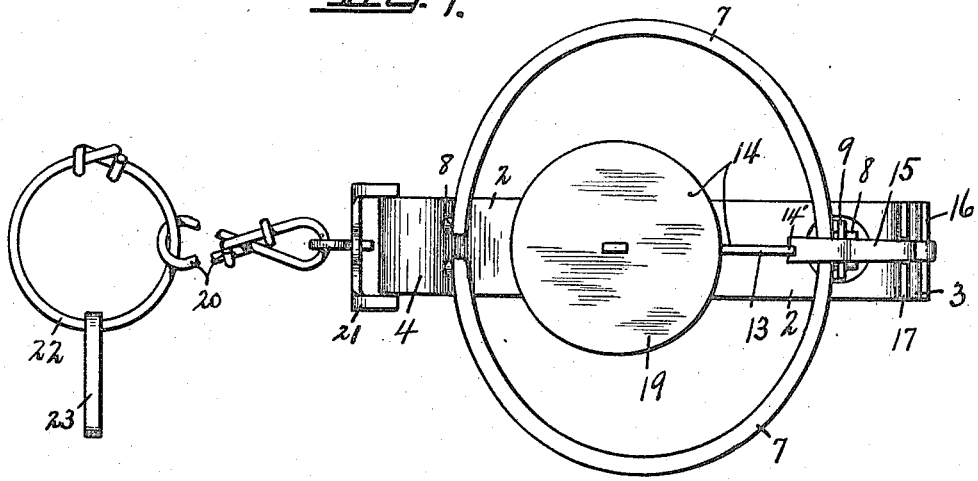

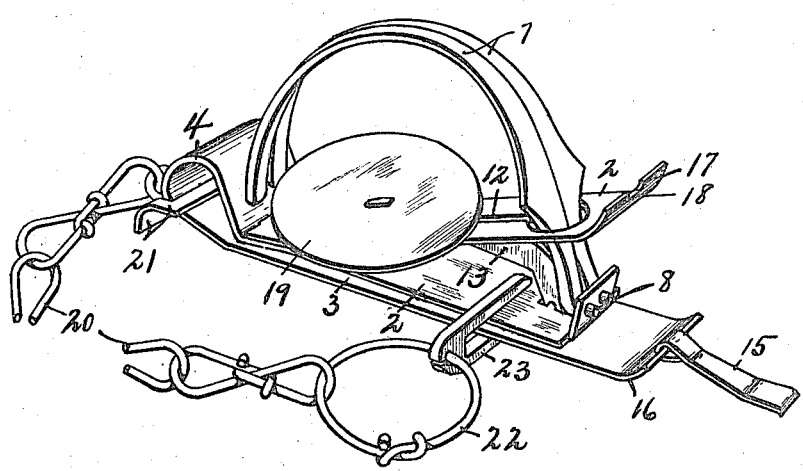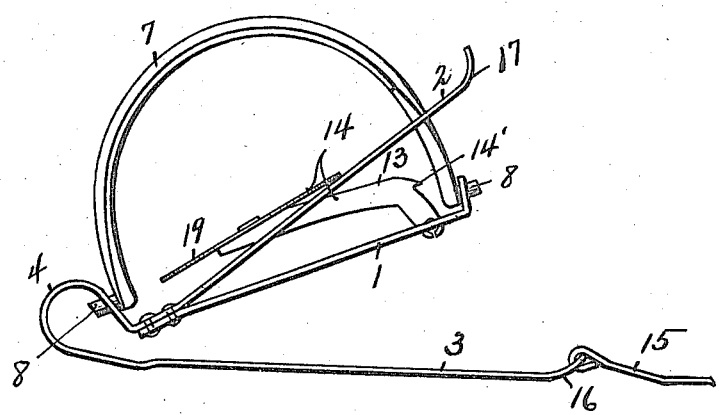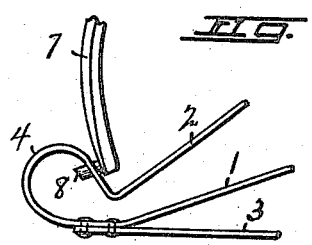

FERRAND F. ELLIS, OF ONEIDA, AND STEPHEN R. LEONARD, OF KENWOOD, NEW YORK, ASSIGNORS TO ONEIDA COMMUNITY, LTD., OF ONEIDA, NEW YORK, A CORPORATION OF NEW YORK.

ANIMAL-TRAP.

1,240,036.   Specification of Letters Patent.   Patented Sept. 11, 1917.

Application filed April 9, 1917. Serial No. 160,686.

*To all whom it may concern:*

Be it known that we, FERRAND F. ELLIS and STEPHEN R. LEONARD, citizens of the United States, and residents of Oneida and Kenwood, respectively, in the county of Madison, in the State of New York, have invented new and useful Improvements in Animal-Traps, of which the following, taken in connection with the accompanying drawings, is a full, clear, and exact description.

This invention relates to certain improvements in animal traps involving the use of a pair of jaws, an actuating spring therefor, and suitable means for setting the jaws against the action of the spring.

The primary object of the invention is to provide means of an improved character in combination with the coacting elements of the trap for elevating or projecting the same upwardly toward the animal to be caught simultaneously with the closing of the jaws, resulting in obtaining a higher and more secure grip upon the animal.

Other objects are attained by the general features of construction whereby the efficiency, simplicity and permanency of the trap are increased.

A specific detail object resides in the provision of means for holding the elevating spring inactive when desired.

In the drawings—

Figure 1 is a top plan view of a trap of this invention in set condition.

Fig. 2 is a side elevation of the same partly in section, the full lines illustrating the trap in "sprung" condition while the dotted lines indicate the "set" condition.

Fig. 3 is a view of the blank utilized for forming the base and elevating spring of Fig. 1.

Fig. 4 is a view of the blank utilized for forming the jaw actuating spring of Fig. 1.

Fig. 5 is a perspective view of the trap illustrating in connection therewith a device for holding the elevating spring inactive.

Fig. 6 is a side elevation of a slightly modified form of trap.

Fig. 7 is a fragmentary view of a further modified form.

The trap, as shown, embodies three overlying strips of metal constituting in this specific illustration a base —1— and springs —2— and —3— disposed upon opposite sides of the base, the spring —2— adapted to actuate jaws, as hereinafter described, and the spring —3— adapted to elevate the trap simultaneously with the closing of the jaws as hereinafter described.

Preferably, each of these overlying strips is formed of sheet metal constituting springs of the unitary leaf type, and preferably two of the overlying strips in Fig. 1, the strips —1— and —3—, are integrally united at one end by a loop —4— which is deflected upwardly from the end of the base —1— and then curved downwardly and return-bent so that in sprung condition of the trap the base —1— diverges outwardly from the spring —3—. Preferably the spring —2— is provided with a tongue —5— adapted to extend through a slot —6— formed at substantially the connection of the base —1— and the loop —4— to form an interlocking connection between the base and spring.

The usual arcuate jaws —7— are provided with pintles —8—, the pintles at one end being journaled in openings formed in a flange —9— integral with the base —1— while the pintles at the opposite end of the jaws are journaled in openings —10— formed in the adjacent side of loop —4—, the loop itself extending above the pintles.

The spring —2— is provided with an opening —11— through which the jaws extend, the spring being thus held by the jaws with its tongue —5— positioned in slot —6—. The spring —2— is further provided with an elongated slot —12— preferably leading to opening —11— through which slot the shank —13— of a bait pan or trigger —14— is adapted to move.

The shank —13— of the bait pan is of the usual angular formation and is provided with the usual catch —14'— for engagement with detent —15— pivoted upon the end of the spring —3—, said end being preferably flanged, as at —16—, to permit the passage of the detent across the end of spring —2— which is likewise preferably flanged upward at —17—, and provided with a slot —18— through which the detent passes.

The bait pan, as shown, is pivotally secured to the base —1—, and preferably the base is provided with an integral pintle and the shank —13— with an open eye adapted to be passed over the pintle and have its ends bent into substantial engagement to constitute a permanent connection between the bait pan and the base. The bait pan extends longitudinally of the base in this particular construction and is provided with the usual platform —19— secured to the shank —13— and lying above the spring —2—.

It will be noted that both springs of the trap are held in set position by a unitary detent and a single bait pan, and that the detent operates directly upon the springs to hold the springs in set position permitting free movement of the jaws to open position by gravity, and that upon movement of the bait pan to release the detent the springs simultaneously operate to elevate the trap and close the jaws, respectively.

In Figs. 1 and 5, the usual chain —20— is shown as secured to the trap, in this specific illustration by a link —21— engaged with the loop —4— and at its opposite end with a ring —22— upon which a U-shaped device —23— is mounted adapted, as shown in Fig. 5, to slide over either adjacent two of the three overlying springs —1—, —2— and —3—, as for instance, the base —1— and spring —3—, to hold the spring —3— inactive so that the trap may be used in the same manner as the ordinary trap without utilizing the elevating spring.

In Fig. 6, a slightly modified form of trap is shown, in that the springs —2— and —3—, instead of the base —1— and spring —3—, are integrally connected by the open loop —4—, the base —1— being secured to one of the springs, as the spring —2—, in any suitable manner, as for instance the rivet shown.

In Fig. 7, a further modified form is shown, in that the base —1— and spring —2— are integrally connected at one end by the open loop —4—, the spring —3— being secured to the base in any suitable manner, as by the rivets shown.

In set position of the trap, the detent —15— which is shown as of somewhat angular formation, extends over the end of spring —2— and between the jaws —7— to engage the catch —14'— upon the bait pan —14—. Upon release of the detent, it is thrown from its position between the jaws by the upward movement of spring —2— and is at the same time withdrawn from such position by the relative separation of base —1— and spring —3—.

It will be noted that in each of the constructions shown the jaws are journaled at one end in the adjacent side of loop —4— and at the opposite end upon an extension of the intermediate one of the overlying members.

It will also be noted that the spring —3— projects beyond the base and beyond the end of the spring —2—, the spring —2— extending beyond the base to permit the unobstructed passage of the detent for engagement with the bait pan.

Although we have shown and described specific constructions of traps as perhaps preferred in embodiments of our invention, it will be readily apparent that various changes may be made in the details of construction, form and arrangement without departing from the spirit of this invention as set forth in the appended claims.

What we claim is:—

1. A trap comprising a base and a jaw-operating spring, a trap-elevating spring integrally united to one of said parts by a loop, and a pair of jaws having one end mounted on the base and the other end journaled in the adjacent side of the loop.

2. In a trap, a base together with underlying and overlying springs, a bait pan mounted on the base, a detent mounted on one of the springs and extending across the other spring to engage the bait pan.

3. A trap comprising three overlying strips of sheet metal, two of said strips being integrally united at one end by an open loop, and jaws having one of their ends journaled in one of said strips and their opposite ends journaled in the adjacent side of the loop.

4. In a trap, a base, a jaw-operating spring, and a trap-elevating spring, a bait pan pivotally mounted on the base and extending through the jaw-operating spring, and a detent pivotally mounted on one of said springs for engagement with the other spring and the bait pan.

5. In a trap, the combination with a base, a pair of jaws and a jaw-operating spring, of a trap-elevating spring, a detent pivotally engaged with the trap-elevating spring and extending over the jaw-operating spring and movable with said spring toward and from the base, and a trigger for holding the detent in engagement with the jaw-operating spring.

6. In a trap, the combination with a base, a pair of jaws, a jaw-operating spring, and a bait pan, of a trap-elevating spring, a detent pivoted to the trap-elevating spring at a point beyond the terminus of the base and extending across the end of the jaw-operating spring and between the jaws to engage the bait pan in set condition of the trap.

7. A trap comprising three overlying leaves diverging from one end of the trap, jaws mounted on the leaves, a trigger mechanism mounted on one leaf and extending through another leaf, and a detent pivotally mounted on one of the leaves and extending over the other leaves and engaging the trigger.

8. A trap comprising a base and a jaw-operating spring, one of said parts having an extension adapted to elevate the trap when sprung; jaws actuated by the spring, a trigger mounted on the base, a detent mounted upon the elevating extension and movable with said extension toward and from the base, said trigger adapted to engage the jaw-operating spring and the trigger to hold the trap in set condition.

9. A trap comprising a base, a jaw-operating spring, a trap-elevating spring united to one of said parts by an integral loop, a pair of jaws having one end mounted on the base and the other end journaled in the adjacent side of the loop, a trigger mounted on the base, and a detent mounted on the trap-elevating spring and adapted to extend across the jaw-operating spring and engage the trigger.

10. In a trap, a base together with an underlying and an overlying spring, a loop at one end integrally uniting two of said members, a bait pan mounted on one of said members and extending through another of said members, and a detent pivotally secured to one of said members and extending across the other members to engage the bait pan.

11. In a trap, three overlying spring members, two of the same being integrally united at one end by an open loop, a pair of jaws having one end journaled on one of said members and their opposite end journaled in the adjacent side of the loop, a trigger mounted on one of said members and extending through another of said members, and a detent pivotally secured to one of the members and extending across the other members to engage the trigger.

12. In a trap, three overlying spring members, two of the same being integrally united at one end by an open loop, a pair of jaws having one end journaled on one of said members and their opposite end journaled in the adjacent side of the loop, a trigger mounted on one of said members, and a detent pivotally secured to one of the members and extending across the other members to engage the trigger.

13. In a trap, a structure embodying three overlying leaves connected at one end of the trap and diverging toward the opposite end, jaws mounted on certain of the leaves, and means for holding the trap in set condition.

14. A trap comprising three overlying leaves connected at one end of the trap and diverging toward the opposite end, jaws having one end extending through the upper leaf and pivotally mounted upon the intermediate leaf, a trigger mounted upon the intermediate leaf and extending through the upper leaf and a detent mounted on the lower leaf and adapted to extend over the other leaves and engage the trigger.

15. In a trap, a structure embodying three overlying leaves, two of the same being integrally united at one end, and all of the same diverging from said end toward the opposite end of the trap, jaws mounted on certain of the leaves, and means for holding the trap in set condition.

16. A trap comprising three overlying leaves, two of the same being integrally united at one end by an open loop, jaws having one end extending through the upper leaf and pivotally mounted upon the intermediate leaf and their opposite ends pivotally mounted in the adjacent side of the loop, a bait pan mounted upon the intermediate leaf and extending through the upper leaf and a detent mounted on the lower leaf and adapted to extend over the other leaves and engage the trigger.

In witness whereof we have hereunto set our hands this 27 day of March, 1917.

FERRAND F. ELLIS.
STEPHEN R. LEONARD.

Witnesses:
W. E. LIFE,
R. E. POWERS.

Copies of this patent may be obtained for five cents each, by addressing the 'Commissioner of Patents Washington, D. C."